(12) United States Patent
Yamada et al.

(10) Patent No.: US 7,789,368 B2
(45) Date of Patent: Sep. 7, 2010

(54) SEAT SLIDE LOCKING DEVICE FOR A VEHICLE

(75) Inventors: Yukifumi Yamada, Toyota (JP); Yasuhiro Kojima, Kariya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 148 days.

(21) Appl. No.: 12/066,666

(22) PCT Filed: Oct. 30, 2006

(86) PCT No.: PCT/JP2006/321637

§ 371 (c)(1), (2), (4) Date: Mar. 13, 2008

(87) PCT Pub. No.: WO2007/052596

PCT Pub. Date: May 10, 2007

(65) Prior Publication Data

US 2009/0050772 A1 Feb. 26, 2009

(30) Foreign Application Priority Data

Nov. 4, 2005 (JP) ............................. 2005-321170

(51) Int. Cl.
*F16M 13/00* (2006.01)
(52) U.S. Cl. .................. 248/430; 248/419; 248/424; 248/429; 296/65.13; 296/65.14; 296/65.15
(58) Field of Classification Search ............... 248/419, 248/424, 429, 430; 296/65.13, 65.14, 65.15
See application file for complete search history.

(56) References Cited

U.S. PATENT DOCUMENTS 3,847,338 A * 11/1974 Adams ...................... 248/419
4,909,469 A * 3/1990 Nihei et al. ................. 248/429
5,855,350 A * 1/1999 Volker et al. ................ 248/430
6,378,928 B1 * 4/2002 Downey .................. 296/65.13
6,616,230 B2 * 9/2003 Niikura ...................... 297/311
6,631,879 B2 * 10/2003 Hibino et al. ............... 248/429
7,165,753 B2 * 1/2007 Oh ............................. 248/429

(Continued)

FOREIGN PATENT DOCUMENTS

DE         100 40 593        3/2002

(Continued)

*Primary Examiner*—Anita M King
*Assistant Examiner*—Nkeisha J Smith
(74) *Attorney, Agent, or Firm*—Oblon, Spivak, McClelland, Maier & Neustadt, L.L.P.

(57) ABSTRACT

A seat slide device for a vehicle capable of preventing generation of noise includes lower rails, upper rails, lock mechanisms, release levers, and stoppers. Each lock mechanism includes a plurality of lock holes provided on the lower rail and arranged in the longitudinal direction of the lower rail and a lock lever provided on the upper rail to be pivotable about a pivot axis extending in the longitudinal direction of the upper rail for engagement with and disengagement from the lock holes. Further, each release lever pivots the lock lever to release the engagement of the lock holes with the lock lever, and each stopper restricts the position at which the release lever remains separated from the lock lever. At least contact portions of the release lever with the lock lever and the stopper are provided with a coating layer made of a resin.

10 Claims, 6 Drawing Sheets

U.S. PATENT DOCUMENTS

| | | | |
|---|---|---|---|
| 2002/0060281 A1* | 5/2002 | Okazaki et al. | 248/424 |
| 2004/0222347 A1* | 11/2004 | Oh | 248/424 |
| 2005/0145768 A1* | 7/2005 | Rohee et al. | 248/430 |
| 2007/0090260 A1* | 4/2007 | Kojima | 248/424 |
| 2007/0145224 A1* | 6/2007 | Yamada et al. | 248/429 |
| 2008/0048087 A1* | 2/2008 | Kojima et al. | 248/430 |

FOREIGN PATENT DOCUMENTS

| | | |
|---|---|---|
| JP | 10 129310 | 5/1998 |
| JP | 11 286230 | 10/1999 |
| JP | 11 342772 | 12/1999 |
| JP | 2004 155305 | 6/2004 |
| JP | 2005082059 A * | 3/2005 |

* cited by examiner

SEAT SLIDE LOCKING DEVICE FOR A VEHICLE

TECHNOLOGICAL FIELD

The present invention relates to a seat slide device for vehicle.

BACKGROUND ART

Heretofore, there has been known a seat slide device for vehicle described in Patent Document 1. As shown in FIG. 6, the seat slide device for vehicle is provided with a lower rail 90, an upper rail 91, a lock mechanism 92 and a release lever 95. The lower rail 90 is secured to a floor of a vehicle. The upper rail 91 is secured to a seat of the vehicle and is supported to be movable relative to the lower rail 90. The lock mechanism 92 has a plurality of lock portions 90a provided on the lower rail 90 and arranged in the longitudinal direction of the lower rail 90 and lock members 93 provided on the upper rail 91 and pivotable about pivot axes extending in the longitudinal direction of the upper rail 91 for engagements with and disengagements from the lock portions 90a. The release lever 95 pivots the lock members 93 by pushing an interlock portion 93a being a part of the lock members 93 and releases the engagements between the lock portions 90a and the lock members 93. Further, the release lever 95 is provided at its extreme end portion 95a with a coating layer 96 made of a resin, through which the extreme end portion 95a is in contact with an operating portion 97 which is operated together with a manipulation lever (not shown).

In the seat slide device for vehicles, in the state that the manipulation lever is not manipulated, the operating portion 97 and the release lever 95 are at a raised position, so that the upper rail 91 is locked by the lock mechanism 92 on the lower rail 90. When the manipulation lever is raised up, the operating portion 97 and the release lever 95 go down to pivot the lock members 93 about the pivot axes, whereby the upper rail 91 is released from the lower rail 90 to make the upper rail 91 movable.

Patent Document 1: German unexamined, published patent application DE10040593A1.

DISCLOSURE OF THE INVENTION

Problem To Be Solved By The Invention

However, in the foregoing prior art seat slide device for vehicle, the coating layer 96 made of a resin is provided at the extreme end portion 95a of the release lever 95, but nothing is provided between the release lever 95 and the interlock portion 93a of the lock member 93 to let them be in direct metal-to-metal contact. This makes a cause to generate noises between the release lever 95 and the lock member 93 when the manipulation lever is manipulated.

Further, in the seat slide device for vehicle, any stopper is not provided for restricting the position at which the release lever 95 remains separated from the lock member 93, and this respect also makes a cause to generate noises.

The present invention has been made taking the problems of the foregoing prior art into consideration and is intended to provide a seat slide device for vehicle capable of preventing the generation of noises.

Measures For Solving The Problems

To solve the foregoing problems, in a first aspect of the present invention, there is provided a seat slide device for vehicle comprising a lower rail adapted to be secured to a floor of a vehicle, an upper rail supported to be movable relative to the lower rail, a lock mechanism having a plurality of lock portions provided on the lower rail and arranged in the longitudinal direction of the lower rail and a lock member provided on the upper rail and pivotable about a pivot axis extending in the longitudinal direction of the upper rail for engagement with and disengagement from the lock portions, a release lever made of a metal for pivoting the lock member to release the engagement between the lock portions and the lock member, and a stopper for restricting a position at which the release lever remains separated from the lock member, wherein the release lever is provided with a coating layer made of a resin or rubber, at at least contact portions thereof with the lock member and the stopper.

In the seat slide device for vehicle in a second aspect of the present invention, the release lever comprises a one-piece member, wherein the coating layer is provided over the entire surface at the both contact portions of the release lever.

In the seat slide device for vehicle in a third aspect of the present invention, the coating layer is in contact with the lock member and the stopper with itself being elastically deformed in the state that the lock portions and the lock member are engaged.

In the seat slide device for vehicle in a fourth aspect of the present invention, the coating layer is provided with an elastically deformable portion, wherein the elastically deformable portion is located at a portion closer to the stopper than the lock member.

In the seat slide device for vehicle in a fifth aspect of the invention, urging means is provided for urging the release lever to be pressed on the stopper.

Effects Of The Invention

In the seat slide device for vehicle in the first aspect of the present invention, since the coating layer made of a resin or rubber is provided at at least the contact portions of the release lever with the lock member and the stopper, any direct metal-to-metal contact does not take place when the manipulation lever is manipulated. Therefore, according to the seat slide device for vehicle, it can be realized to prevent the generation of noises.

In the seat slide device for vehicle in the second aspect of the present invention, since the coating layer made of a resin or rubber is provided over the entire surface at the contact portions of the release lever with the lock member and the stopper, the manufacturing becomes easy compared with the case wherein coating layers are provided at individual contact portions.

In the seat slide device for vehicle in the third aspect of the present invention, since the coating layer is in contact with the lock member and the stopper with itself being elastically deformed in the state that the lock portions and the lock member are engaged, it can be prevented that a load is suddenly exerted on the manipulation lever when the same is manipulated. Thus, it can be realized to manipulate the manipulation lever smooth.

In the seat slide device for vehicle in the fourth aspect of the present invention, since the elastically deformable portion is located at the portion closer to the stopper than the lock member, the elastic deformation force of the coating layer is restrained from being exerted on the lock member, so that the force urging the lock member toward the lock position can be made to be weak.

In the seat slide device for vehicle in the fifth aspect of the present invention, since the urging means urges the release lever to be pressed on the stopper, it can be suppressed that the elastic deformation force of the cover layer is exerted on the lock member.

DESCRIPTION OF REFERENCE SYMBOLS

Figure 1:
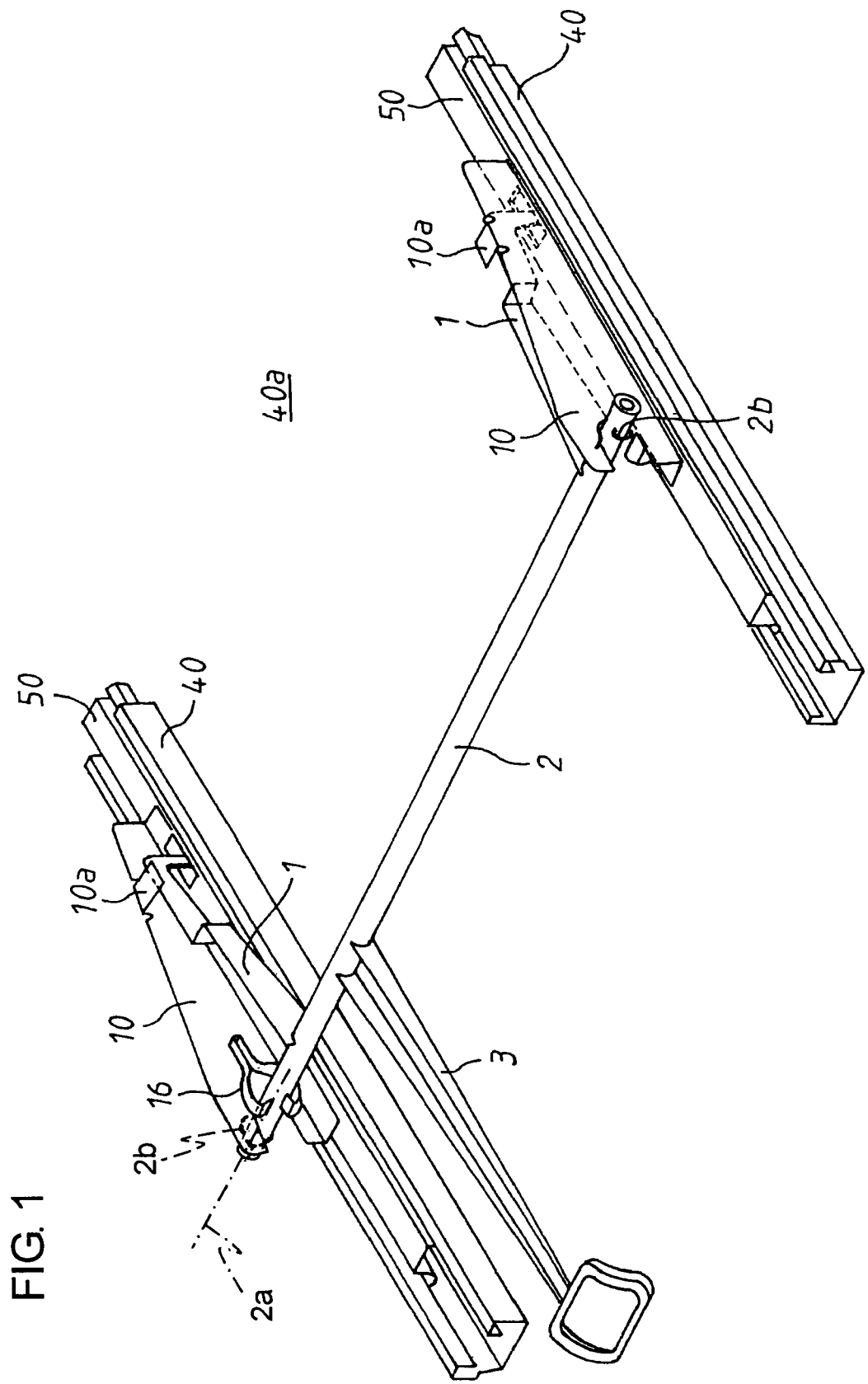
[FIG. 1] is a perspective view of a seat slide device for vehicle in an embodiment.

40 . . . lower rail, 41 . . . lock portions (lock holes), 50 . . . upper rail, 60 . . . lock mechanism, 61 . . . pivot axis, 63 . . . lock member (lock lever), 1 . . . release lever, 1a, 1b . . . contact portions, 10a . . . stopper, 5, 6 . . . coating layer, 7 . . . elastically deformable portion, 2b . . . urging means (spring)

PREFERRED EMBODIMENTS FOR PRACTICING THE INVENTION

Hereafter, an embodiment of a seat slide device for vehicle according to the present invention will be described with reference to the drawings. As shown in FIGS. 1 to 4, the seat slide device for vehicle is provided with lower rails 40, upper rails 50, lock mechanisms 60, release levers 1 and stoppers 10a. The lower rails 40 are secured to a floor of a vehicle. The upper rails 50 are secured to a seat of the vehicle and supported along the lower rails 40 to be movable in a forward-rearward direction within a rail plane 40a. Each lock mechanism 60 has a plurality of lock holes 41 as lock portions provided on the lower rail 40 and arranged in the longitudinal direction of the lower rail 40 and a lock lever 63 as lock member provided on the upper rail 50 and pivotable about a pivot axis extending in the longitudinal direction of the upper rail 50 to be engageable with and disengageable from the lock holes 41. Each release lever 1 comprises a one-piece member and pivots the lock lever 63 by pressing an interlock portion 63b as a part of the lock lever 63, to release the engagement between the lock holes 41 and the lock lever 63. Further, each stopper 10a is a part of a bracket 10 referred to later and restricts the position at which the release lever 1 remains separated from the lock lever 63. Further, a torque rod 2 is carried on the upper rails 50 to be pivotable about an axis 2a and pivots the release levers 1 when pivoted by a manipulation lever 3. The torque rod 2 passes through brackets 10 which are bodily secured to the upper rails 50 to stand upright relative to the rail plane 40a, and springs 2b as urging means are provided outside the brackets 10. The springs 2b act as safety locks for the torque rod 2 and urge the manipulation lever 3 downward to press the release levers 1 on the stoppers 10a. Further, leaf springs 16 for restraining the torque rod 2 to be pivotable are provided inside of the brackets 10. The manipulation lever 3 is secured to the torque rod 2 on the forward side, whereas the release levers 1 are secured to the torque rod 2 on the rearward side.

Figure 2:
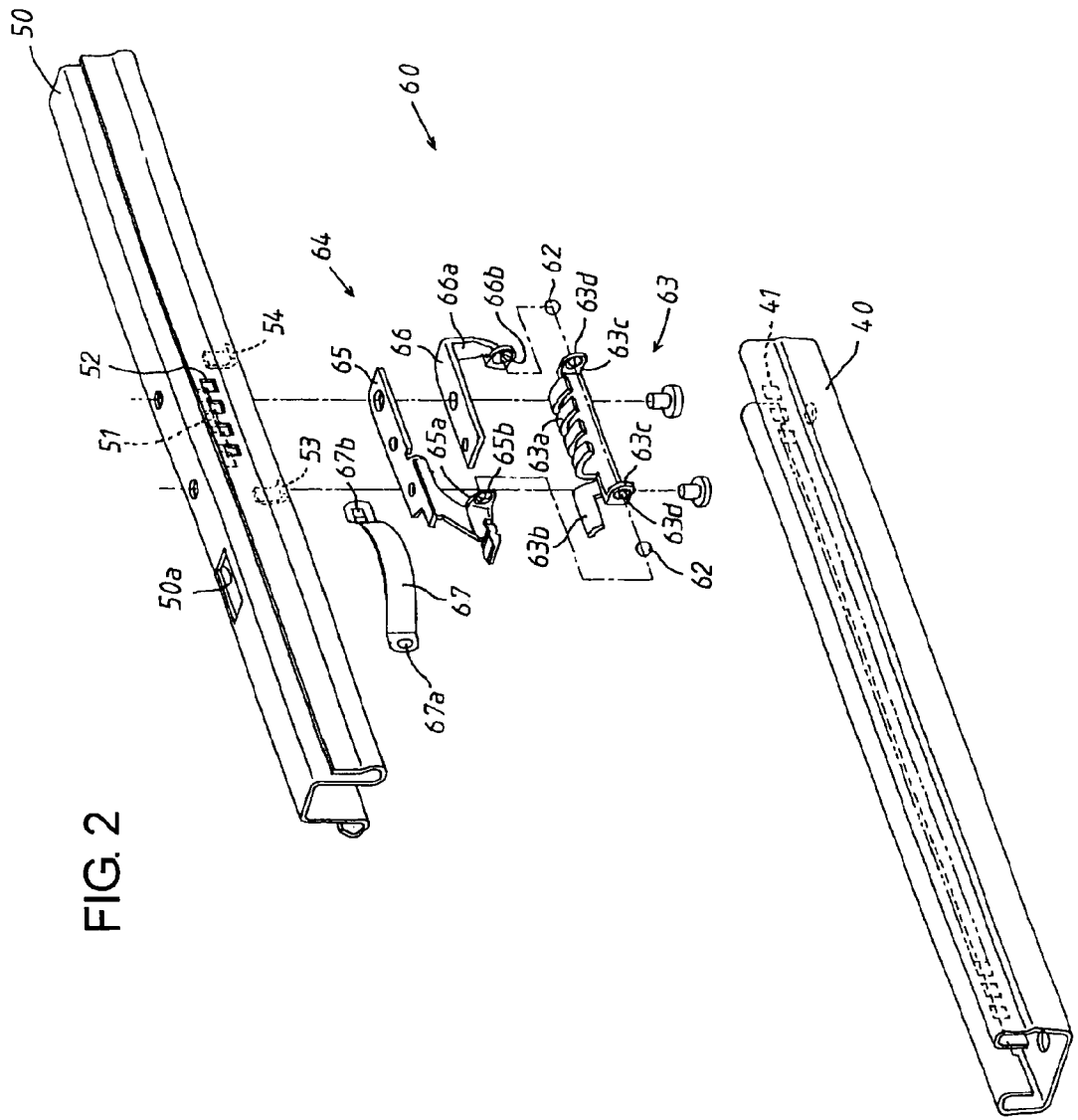
[FIG. 2] is a perspective view in a disassembled state of parts of the seat slide device for vehicle in the embodiment.

Next, respective parts will be described in detail. As apparent from FIG. 1, the seat slide device for vehicle has two rail assemblies arranged in parallel on the left and right sides as viewed in FIG. 1, and the rail assembly on the left side is symmetrical in configuration with that on the right side. Therefore, for convenience in description, the following detailed description on the respective parts of each rail assembly will be made mainly regarding the rail assembly on the left side. However, the rail assembly on the right side will be referred to from time to time in describing the connection between the both rail assemblies. As shown in FIG. 2, the plurality of lock holes 41 constituting the lock mechanism 60 are arranged on an inner portion of each lower rail 40 in the longitudinal direction of the same. Each upper rail 50 has a plurality of through holes 51 and another plurality of through holes 52 which face the respective lock holes 41 on the inner and outer sides of the lower rail 40. Further, each upper rail 50 is provided with an insertion hole 50a through which an extreme end portion of the release lever 1 passes. Further, the upper rail 50 is provided with cutout holes 53, 54, which allow pivot plates 63c of the lock lever 63, support plates 65b, 66b of a lock bracket 64 and balls 62 to pass therethrough, as referred to later.

Figure 3:
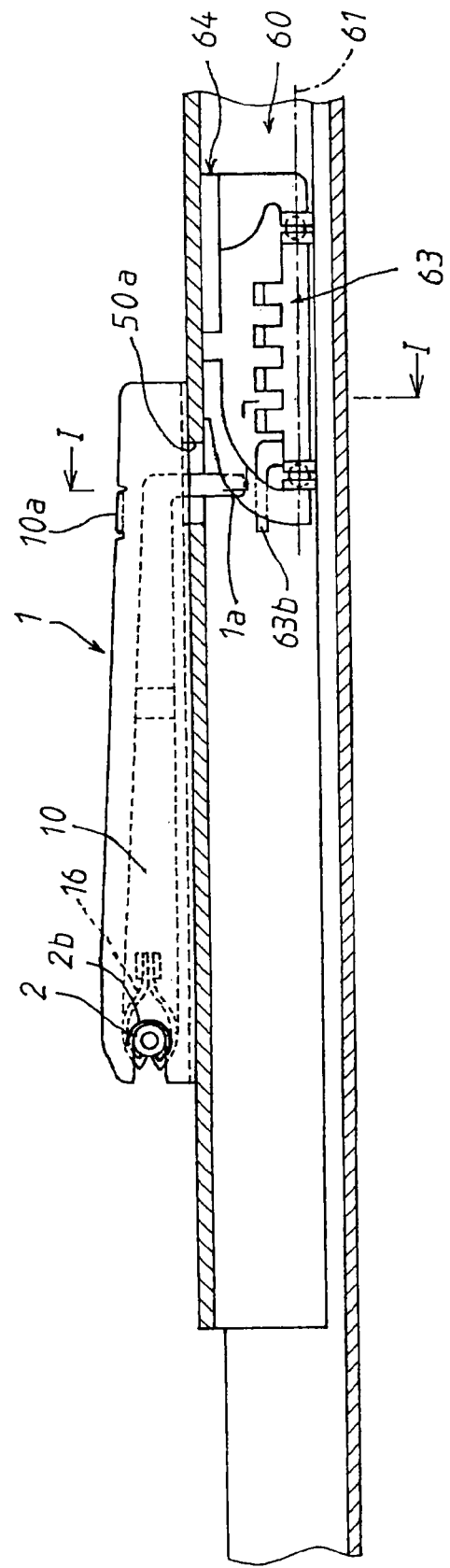
[FIG. 3] is a fragmentary sectional view of the seat slide device for vehicle in the embodiment.

Each lock mechanism 60 has the lock holes 41, the through holes 51, 52, the balls 62, the lock lever 63 and the lock bracket 64. In the state that the lock lever 63 is assembled to the upper rail 50 as shown in FIG. 3, the lock lever 63 is held pivotable about the pivot axis 61 extending in the longitudinal direction of the upper rail 50. As shown in FIG. 2, the balls 62 comprise steel balls and ensure smooth pivot movement of the lock lever 63 about the pivot axis 61 while restraining the lock lever 63 from having a looseness or play.

Figure 4:
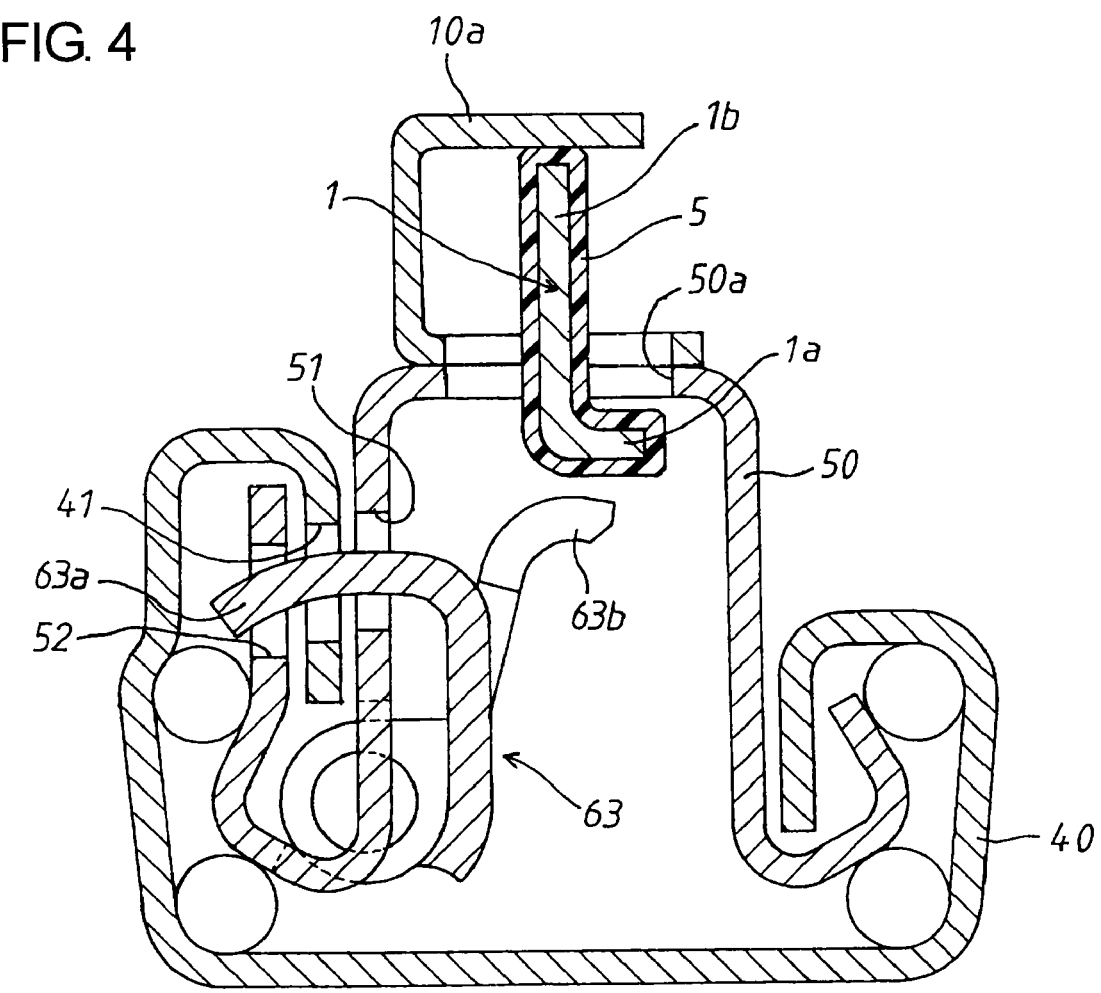
[FIG. 4] is a sectional view taken along the line I-I in FIG. 3, relating to the embodiment.

The lock lever 63 is provided at its upper part with lock claws 63a which are engageable with and disengageable from the lock holes 41. Further, the lock lever 63 is provided at its backside with the interlock portion 63b, which is engageable with a contact portion 1a of the release lever 1 for pivotally operating the lock lever 63, as shown in FIGS. 3 and 4. As shown in FIG. 2, the two pivot plates 63c which are supported by the lock bracket 64 are provided at the opposite end portions of the lock lever 63 bodily with the same. Each pivot plate 63c has formed thereon a hollow portion 63d having a hemispherical hollow surface the curvature radius of which is greater than the curvature radius of the outer spherical surface of the ball 62.

The lock bracket 64 is composed of a first bracket 65 and a second bracket 66, which are secured to the upper rail 50 over the lower rail 40. The two support plates 65a, 66a which support the lock lever 63 are provided at opposite ends of the first bracket 65 and the second brackets 66 bodily with the same. Hollow portions 65b, 66b having hemispherical hollow surfaces which are greater in curvature radius than the outer spherical surfaces of the balls 62 are formed on the respective support plates 65a, 66a to face the hollow portions 63d of the pivot plates 63c.

The balls 62 are fitted between the hollow portions 65b, 66b of the respective support plates 65a, 66a and the hollow portions 63d of the respective pivot plates 63c. Thus, the lock lever 63 is supported by the lock bracket 64 through the balls 62 and is held pivotable about the pivot axis 61 extending in the longitudinal direction of the upper rail 50.

Further, within the cross-sections of the both rails 40, 50, a lock spring 67 is secured to the upper rail 50 through an attaching hole 67a provided at one end thereof and is assembled to the upper rail 50 through an adjusting hole 67b provided at the other end thereof for the other end to be movable in the forward-rearward direction. The lock spring 67 is engaged with the lock lever 63 at its center portion which is curved to take the form of a circular arc, and urges the lock lever 63 to engage the lock claws 63a with the lock holes 41.

As shown in FIG. 4, a coating layer 5 is provided over the entire surface of the extreme end portion of the release lever 1 which portion includes the contact portion 1a with the lock lever 63 and another contact portion 1b with the stopper 10a.

In the seat slide device for vehicle as constructed above, in the state that the manipulation lever 3 is not manipulated (lock state), as shown in FIG. 4, the extreme end portion of the release lever 1 is raised up to bring the contact portion 1b into contact with the stopper 10a and to bring the contact portion 1a into separation from the interlock portion 63b of the lock lever 63. Thus, the urging force of the lock spring 67 effectively acts on the lock lever 63 to pivot, and the lock claws 63a are held in the state that they are fitted in the lock holes 41, whereby the upper rail 50 is locked on the lower rail 40.

When the manipulation lever 3 is drawn up, the extreme end portion of the release lever 1 is lowered. Thus, the contact portion 1b is separated from the stopper 10a, and the contact portion 1a is brought into contact with the interlock portion 63b of the lock lever 63. At this time, no noise is generated because the coating layer 5 is provided over the entire surface of the extreme end portion of the release lever 1 not to make direct contact of the contact portion 1a with the interlock portion 63b. When the manipulation lever 3 is further drawn up, the contact portion 1a pushes the interlock portion 63b down to pivot the lock lever 63, whereby the engagements of the lock claws 63a with the lock holes 41 are released to make the upper rail 50 movable (released state).

When the manipulation lever 3 is released after the position of the seat is adjusted through the movements of the upper rails 50, the extreme end portion of the release lever 1 is raised up, and this causes the contact portion 1a to separate from the interlock portion 63b of the lock lever 63 and the contact portion 1b to then come into contact with the stopper 10a. At this time, no noise is generated because the coating layer 5 is provided over the entire surface of the extreme end portion of the release lever 1 not to make direct contact of the contact portion 1b with the stopper 10a. In this way, return is made to the state shown in FIG. 4, whereby the upper rails 50 are locked on the lower rails 40. Although the operation of the seat slide device has been described mainly regarding the rail assembly on the left side as viewed in FIG. 1, it is to be noted that the rail assembly on the right side operates in substantially the same manner as the rail assembly on the left side does.

Figure 5:
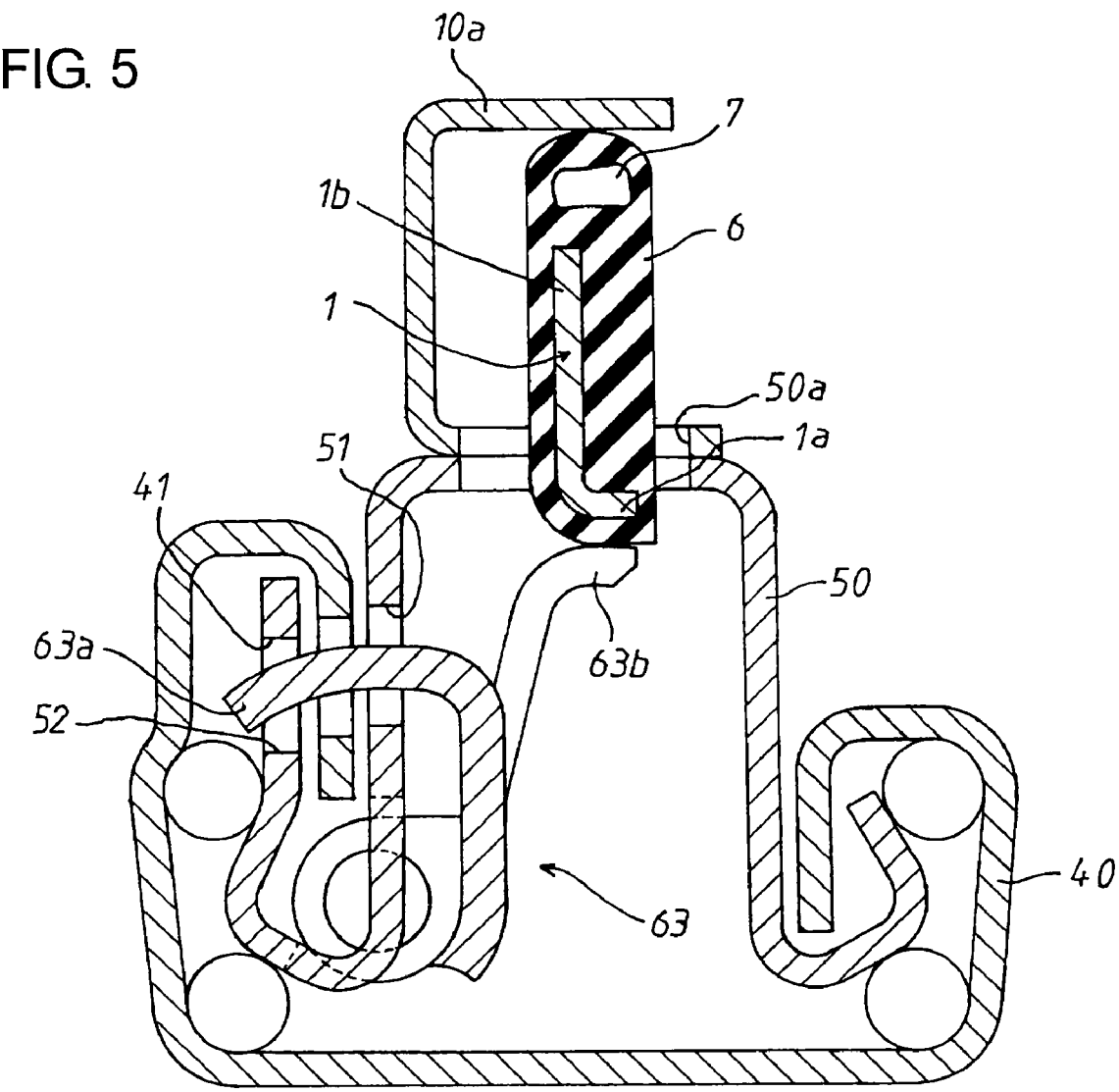
[FIG. 5] is a sectional view taken along the line I-I in FIG. 3, relating to another embodiment.
Figure 6:
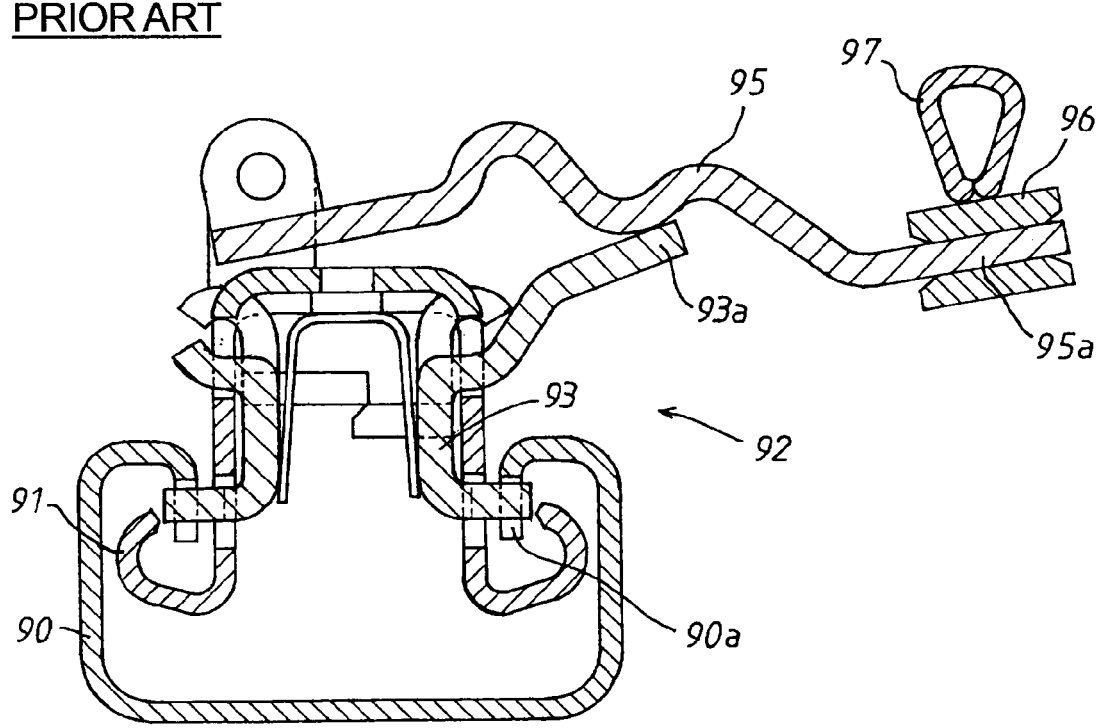
[FIG. 6] is a sectional view of a seat slide device for vehicle in prior art.

Further, as shown in FIG. 5, a rubber member with an elastically deformable portion 7 may be used as a coating layer 6 which covers up the entire surface of the extreme end portion of the release lever 1 which portion includes the contact portion 1a with the lock lever 63 and the contact portion 1b with the stopper 10a. Herein, the elastically deformable portion 7 is referred to as a portion that is a part of the coating layer 6 and that is greater in elastic deformation than other parts of the coating layer 6, and in the present embodiment, includes a space opening on the front or face side of the drawing sheet. Further, the elastically deformable portion 7 is located at a portion closer to the stopper 10a than the lock lever 63. Although in the present embodiment, the elastically deformable portion 7 is defined as the space opening on the face side of the drawing sheet, it may be defined as a space opening on the reverse side, the left side or the right side of the drawing sheet. Further, in the state that the lock claws 63a are engaged with the lock holes 41, the coating layer 6 is in contact with the lock lever 63 and the stopper 10a with itself being elastically deformed. In this state, the force with which the coating layer 6 pushes the lock lever 63 through its elastic deformation is set to be weaker than the force with which the lock spring 67 urges the lock lever 63 toward the lock position. In assembling, it is possible to arrange the extreme end portion of the release lever 1 between the stopper 10a and the interlock portion 63b as the coating layer 6 is deformed to compress the elastically deformable portion 7.

In the seat slide device for vehicle, as shown in FIG. 5, in the state that the manipulation lever 3 is not manipulated (lock state), the extreme end portion of the release lever 1 is at the raised position, nevertheless the contact portion 1a is in contact with the interlock portion 63b of the lock lever 63 through the coating layer 6. However, as described earlier, since the force with which the coating layer 6 pushes the lock lever 63 through its elastic deformation is set to be weaker than the force with which the lock spring 67 urges the lock lever 63 toward the lock position, the lock claws 63a are reliably held in the state that they are in engagements with the lock holes 41. Although in the seat slide device for vehicle, the elastically deformable portion 7 is located at the portion closer to the stopper 10a than the lock lever 63, it may be located at another portion closer to the lock lever 63 than the stopper 10a.

Further, although in the present embodiment, the springs 2b as urging means urge the release levers 1 to be pressed on the stoppers 10a, such urging means may urge the release levers 1 to be pressed on the lock levers 63.

In the foregoing description, the seat slide device for vehicle according to the present invention has been described on the basis of the embodiment. However, it is needless to say that the present invention is not limited to the embodiment and can be practiced in a form modified properly without departing from the technical concept of the present invention.

INDUSTRIAL APPLICABILITY

The seat slide device for vehicle according to the present invention is suitable to prevent the generation of noise because the operation of a manipulation lever does not cause any direct metal-to-metal contact to occur.

The invention claimed is:

1. A seat slide device for a vehicle, comprising:
at least one lower rail adapted to be secured to a floor of a vehicle;
at least one upper rail adapted to be secured to a seat of the vehicle and supported along the at least one lower rail to be movable relative thereto;
a lock mechanism including a plurality of lock portions provided on the at least one lower rail and arranged in the longitudinal direction of the at least lower rail and a lock member provided on the at least one upper rail to be pivotable about a pivot axis extending in the longitudinal direction of the at least one upper rail for engagement with and disengagement from the lock portions;
a release lever made of a metal and provided on the at least one upper rail for pivoting the lock member to release the engagement of the lock portions with the lock member;

a stopper provided on the at least one upper rail that restricts a position at which the release lever remains; and a coating layer made of one of resin and rubber, the coating layer formed at one or more of contact portions between the release lever and the lock member, and the release lever and the stopper, wherein the stopper is disposed such that, in a locked position, the release lever and the coating layer therebetween remain separated from the lock member.

2. The seat slide device for a vehicle according to claim 1, wherein the release lever is a one-piece member, and wherein the coating layer is provided over an entire surface of the release lever at a first contact portion between the release lever and the stopper and between a second contact portion between the release lever and the lock member.

3. The seat slide device for a vehicle according to claim 1, wherein in a state that the lock portions and the lock member are engaged, the coating layer is in contact with the lock member and the stopper, such that the contact layer is elastically deformed.

4. The seat slide device for vehicle according to claim 3, wherein the coating layer comprises an elastically deformable portion, and wherein the elastically deformable portion is located at a portion closer to the stopper than the lock member.

5. The seat slide device for a vehicle according to claim 1, further comprising urging means for urging the release lever to be pressed on the stopper.

6. The seat slide device for a vehicle according to claim 1, wherein two lower rails extend in parallel with each other;

two upper rails, respectively supported on the two lower rails, are slidable along the two lower rails, the two lower rails and the two upper rails constituting two rail assemblies; and each of the two rail assemblies is symmetrical in construction and is provided with the lock mechanism, the release lever, and the stopper.

7. The seat slide device for a vehicle according to claim 6, further comprising:

a torque rod pivotably carried on the two upper rails at opposite end portions thereof and extending transversely of the two upper rails;

a manipulation lever radially extending from the torque rod in a first radial direction; and means for urging the torque rod to pivot in one direction about the axis of the torque rod, wherein the release lever radially extends from each of the opposite end portions of the torque rod in a second radial direction opposite to the first radial direction and is urged by the means for urging to bring an extreme end portion thereof into contact with the stopper.

8. The seat slide device for a vehicle according to claim 1, wherein in an unlocked position, the coating layer at the contact portion between the release lever and the lock member is in contact with the lock member.

9. The seat slide device for a vehicle according to claim 1, wherein the at least one upper rail and the at least one lower rail slide together forming a substantially hollow interior cavity, and wherein the lock member is configured such that a lever portion of the lock member, which is to be pressed on by the release lever, is disposed within the interior cavity between an inner upper surface of the at least one upper rail and an inner lower surface of the at least one lower rail, thereby minimizing a space required for the slide device under the vehicle seat.

10. The seat slide device for a vehicle according to claim 1, wherein the coating layer is formed at all contact portions between the release lever and the lock member, and the release lever and the stopper.

* * * * *